(12) United States Patent
Rallings (10) Patent No.: US 11,760,477 B2
(45) Date of Patent: Sep. 19, 2023

(54) MOTOR VEHICLES FOR USE ON THE GROUND AND IN THE AIR

(71) Applicant: Alan Rallings, Dorchester (GB)

(72) Inventor: Alan Rallings, Dorchester (GB)

(*) Notice: Subject to any disclaimer, the term of this patent is extended or adjusted under 35 U.S.C. 154(b) by 13 days.

(21) Appl. No.: 17/640,476

(22) PCT Filed: Sep. 4, 2020

(86) PCT No.: PCT/GB2020/000072
§ 371 (c)(1),
(2) Date: Mar. 4, 2022

(87) PCT Pub. No.: WO2021/044110
PCT Pub. Date: Mar. 11, 2021

(65) Prior Publication Data
US 2022/0332413 A1   Oct. 20, 2022

(30) Foreign Application Priority Data
Sep. 5, 2019 (GB) .................................... 1912762

(51) Int. Cl.
| B64C 37/00 | (2006.01) |
| B64C 7/00 | (2006.01) |
| B60F 5/02 | (2006.01) |
| B64C 13/34 | (2006.01) |
| B64C 25/36 | (2006.01) |
| B64C 39/02 | (2023.01) |
| B64D 27/24 | (2006.01) |

(Continued)

(52) U.S. Cl.
CPC .................. *B64C 7/00* (2013.01); *B60F 5/02* (2013.01); *B64C 13/34* (2013.01); *B64C 25/36* (2013.01); *B64C 39/024* (2013.01); *B64D 27/24* (2013.01); *B64D 35/04* (2013.01); *B64U 30/20* (2023.01); *B64U 50/19* (2023.01)

(58) Field of Classification Search
CPC ......... B64C 37/00; B64C 25/36; B64D 27/24; B64D 35/04; B64U 30/20; B64U 50/19
See application file for complete search history.

(56) References Cited

U.S. PATENT DOCUMENTS

| 2014/0061362 A1* | 3/2014 | Olm ........................ B64C 37/00 244/2 |
| 2015/0093956 A1* | 4/2015 | Mielniczek ............ A63H 27/12 446/37 |

FOREIGN PATENT DOCUMENTS

| CN | 103213466 B | 12/2015 |
| CN | 106364612 A * | 2/2017 ............. B62K 11/02 |

(Continued)

*Primary Examiner* — Tye William Abell
(74) *Attorney, Agent, or Firm* — Richard M. Goldberg (57) ABSTRACT

A motor vehicle (100) has four centreless wheels (10) drivable for use on the ground and four propellers (16) rotatable within the open centres of the wheels (10) for use in the air. The wheel-propeller assemblies (10, 16) are carried on mounting units (14) secured to a frame (12). The mounting units (14) are rotatable on the frame (12) and the wheel-propeller assemblies (10, 16) are rotatable on their respective mounting units (14), in each case by means of servomotors, to convert the vehicle (1009) from its ground mode shown in FIG. 1 to its air mode as shown in FIG. 2, and also to turn the wheel-propeller assemblies (10, 16) so as to steer the vehicle (100) when on the ground and to tilt the wheel-propeller assemblies (10, 16) so as to direct the vehicle (100) when in the air.

19 Claims, 11 Drawing Sheets

(51) Int. Cl.
*B64D 35/04* (2006.01)
*B64U 30/20* (2023.01)
*B64U 50/19* (2023.01)

(56) References Cited

FOREIGN PATENT DOCUMENTS

| | | |
|---|---|---|
| CN | 106364612 A | 2/2017 |
| GB | 2552650 A | 2/2018 |
| KR | 20160136594 A | 11/2016 |
| WO | 2013182708 A1 | 12/2013 |
| WO | 2018080509 A1 | 5/2018 |
| WO | 2018232430 A1 | 12/2018 |
| WO | 2019060933 A1 | 4/2019 |
| WO | WO-2019060933 A1 * 4/2019 ............. B60B 19/00 |

* cited by examiner

MOTOR VEHICLES FOR USE ON THE GROUND AND IN THE AIR

TECHNICAL FIELD

This invention relates to motor vehicles for use on the ground and in the air, particularly but not necessarily exclusively as unmanned ground vehicles (UGVs) and unmanned airborne vehicles (UAVs).

BACKGROUND OF THE INVENTION

The invention utilises the technology of a centreless wheel, sometimes called a hubless wheel or spokeless wheel, which is to say a wheel comprising an annular rotor with an open centre, an outer surface engageable with the ground and an inner surface engageable with a drive mechanism to rotate the rotor about an axis and thereby drive the vehicle forwards or backwards across the ground.

British patent GB2552650 describes a centreless wheel mechanism in a ground vehicle. The centreless wheel comprises a rotor that is annular around a first axis and has an outer surface for engagement with the ground and an inner surface that engages with a drive mechanism. The rotor is mounted in a member which is also annular about the axis of the rotor, and this member provides a housing for the drive mechanism. A connection assembly connects the centreless wheel to a vehicle. The centreless wheel further comprises an actuator configured and arranged to rotate the housing around a second axis, and this rotation moves the first axis alternatively upwards and downwards, ie in elevation, to vary the clearance of the vehicle over the ground.

International patent application WO2018/232430 concerns the concept of a centreless wheel in a vehicle for use on the ground and in the air. This centreless wheel is rotatable to drive the vehicle on the ground and has in its open centre a propeller, coaxial with the wheel, to propel the vehicle in the air. WO2018/232430 illustrates the transition of the wheel-propeller combination from rotation about an azimuthal axis for use of the vehicle on the ground to rotation about an axis with an elevational component for use of the vehicle in the air, but it does not describe any mechanism for achieving the transition.

The starting point for the present invention is the application of the mechanism of GB2552650 to the concept of WO2018/232430.

BRIEF SUMMARY OF THE INVENTION

According to the invention, there is provided a motor vehicle having a ground mode for use of the vehicle on the ground and an air mode for use of the vehicle in the air, which motor vehicle comprises:

a frame;

a plurality of centreless wheels each having an associated mounting unit whereby it is mounted on the frame, each said wheel comprising an annular rotor carried on a stator and being drivable thereabout, which rotor has an open centre and is engageable with the ground when the vehicle is in its ground mode;

on or in each mounting unit, wheel drive means operatively connected to the rotor of the respective wheel and operable to rotate that rotor;

a plurality of propellers each associated with a respective centreless wheel and being rotatable within the open centre thereof when the vehicle is in its air mode; and propeller drive means operatively connected to each propeller and operable to drive it when the vehicle is in its air mode.

Preferably each stator is configured and arranged to be rotatable eg by rotary actuators about three stator axes respectively extending (a) in an X-X direction extending up and down relative to the vehicle, (b) in a Y-Y direction extending from side to side relative to the vehicle and (c) in a Z-Z direction extending forward and backward relative to the vehicle.

It should be noted that the invention provides a mechanism not detailed in WO2018/232430 for deploying a wheel+propeller assembly of a vehicle from a substantially upright orientation in a ground mode to a substantially flat orientation in an air mode. And it will be understood that in the air mode the mechanism means that the propellers, each shrouded by a wheel, can be tilted to drive the vehicle in a desired direction as well as keeping it in the air.

Other features of the invention will be apparent from the following description, which is made by way of example only with reference to the accompanying schematic drawings.

DETAILED DESCRIPTION OF THE INVENTION

Figure 1:
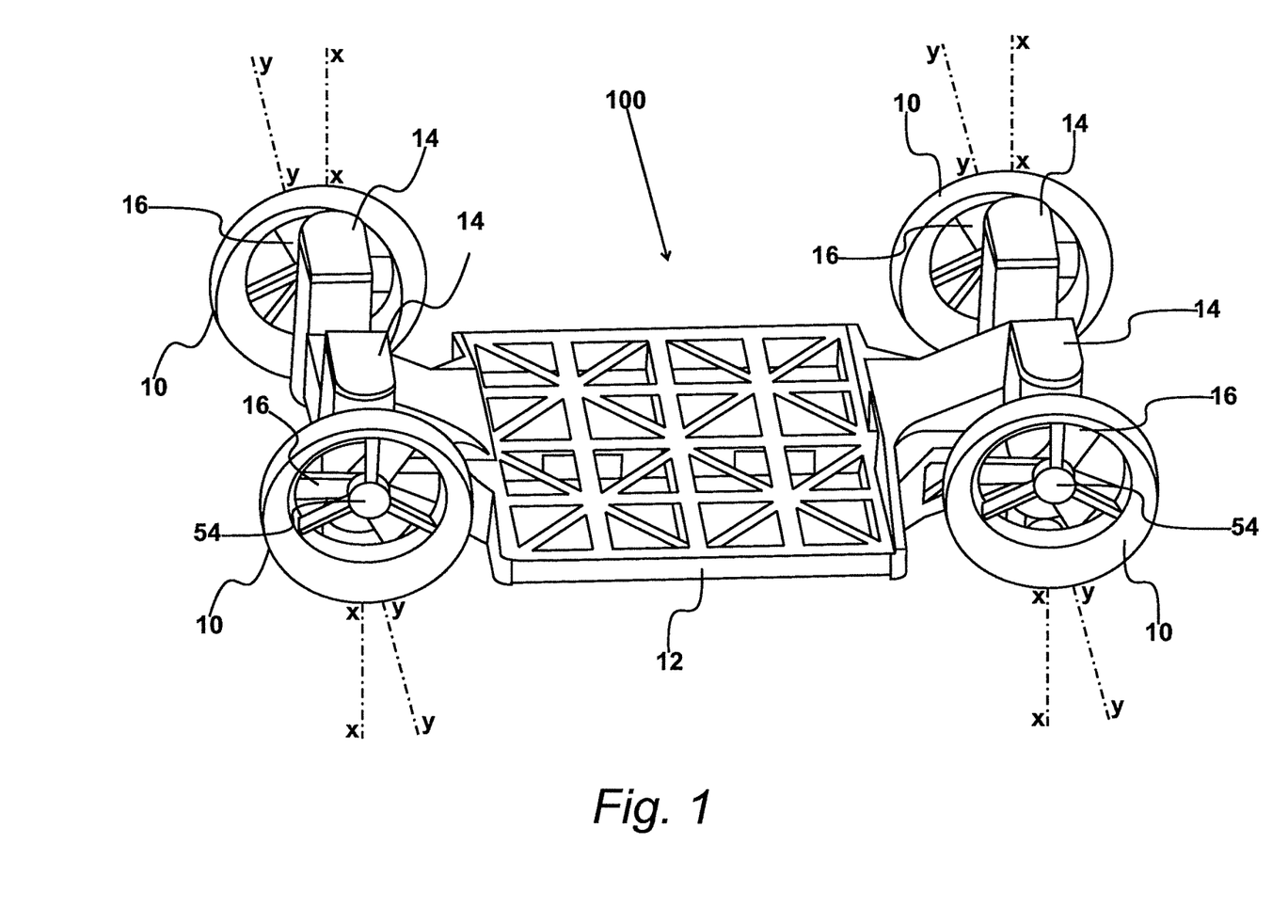
FIG. 1 is an isometric view of a motor vehicle according to the invention in ground mode.

A motor vehicle 100 embodying the invention as illustrated in ground mode in FIG. 1 comprises four centreless wheels 10 each upright (in a substantially vertical plane) and mounted on a frame 12 by way of an associated mounting unit 14. Each of the wheels 10 is engageable with the ground when the vehicle 100 is in ground mode and drivable (by means to be described in more detail hereinafter) about a wheel axis extending in a Y-Y direction extending from side to side of the vehicle 100 to drive it over the ground. The vehicle 100 can be steered by rotating the wheels 10 about axes extending in an X-X direction up and down relative to the vehicle 100.

Within the open centre of each wheel 10 is a propeller 16 also drivable by means to be described in more detail hereinafter.

Figure 2:
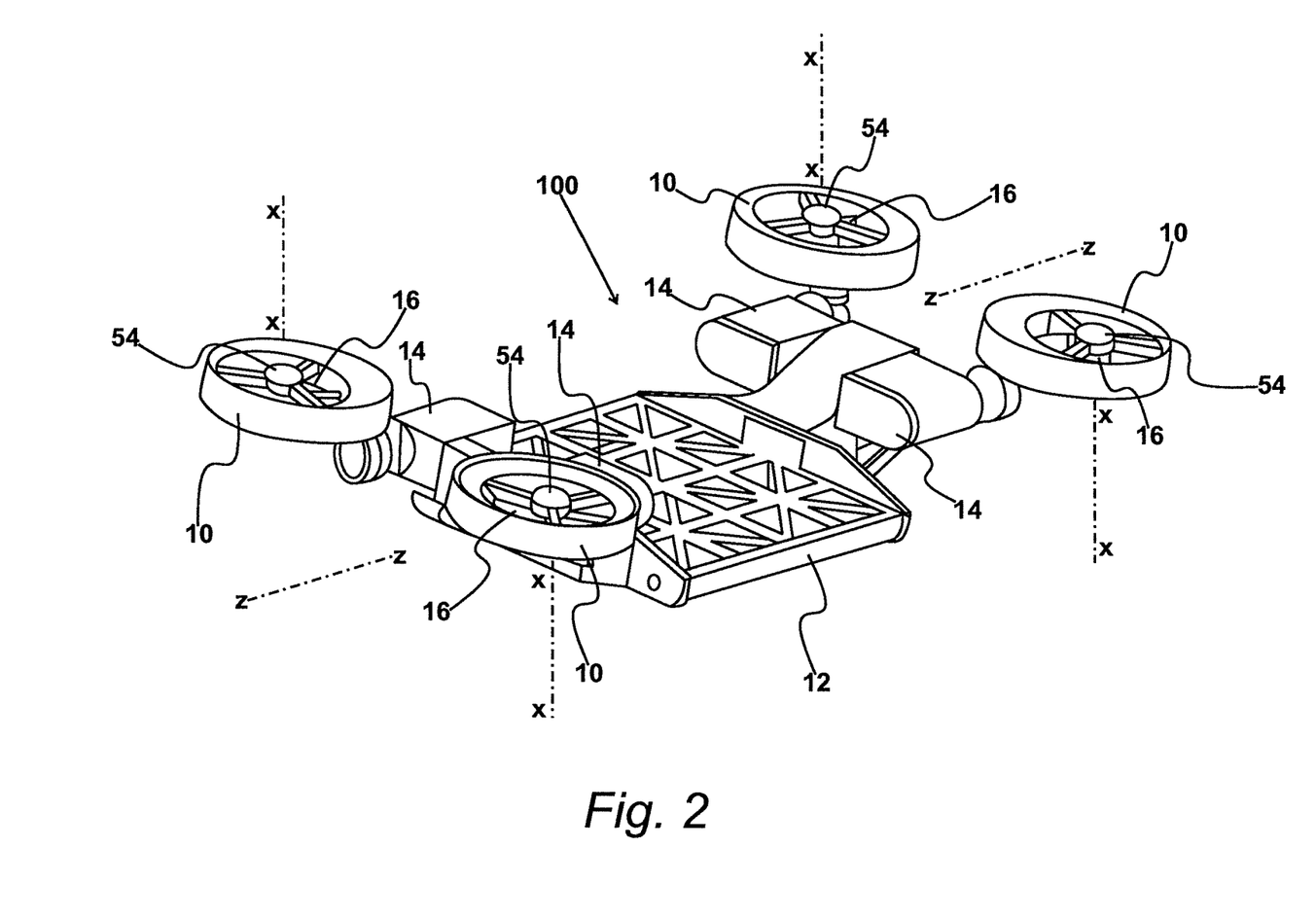
FIG. 2 is an isometric view of the motor vehicle of FIG. 1 in air mode.

FIG. 2 shows the motor vehicle 100 of FIG. 1 reconfigured to air mode. Thus the centreless wheels 10 and the propellers 16 within their open centres now appear horizontal (ie in a substantially azimuthal plane) rather than upright. Details of the reconfiguration from ground mode (FIG. 1) to air mode (FIG. 2) will be described hereinafter, but as can be seen by comparing FIG. 2 with FIG. 1 this includes rotating the mounting units 14 through a right angle about side to side axes (not detailed in FIG. 2 for simplicity of illustration).

In the air mode, driving the propellers 16 about the X-X axes provides lift for the vehicle 100. The drive can be varied to move the vehicle 100 up and down in the air, and the propellers can be tilted (ie rotated by a small amount) about a side to side axis to direct the vehicle 100 forwards or backwards in the Z-Z direction and/or about a forward and backward axis to direct the vehicle 100 sideways and/or to bank it.

Also, in the air mode, each wheel 10 provides a shroud for its associated rotating propeller 16, for safety and possibly offering improved control in side winds.

Figure 3:
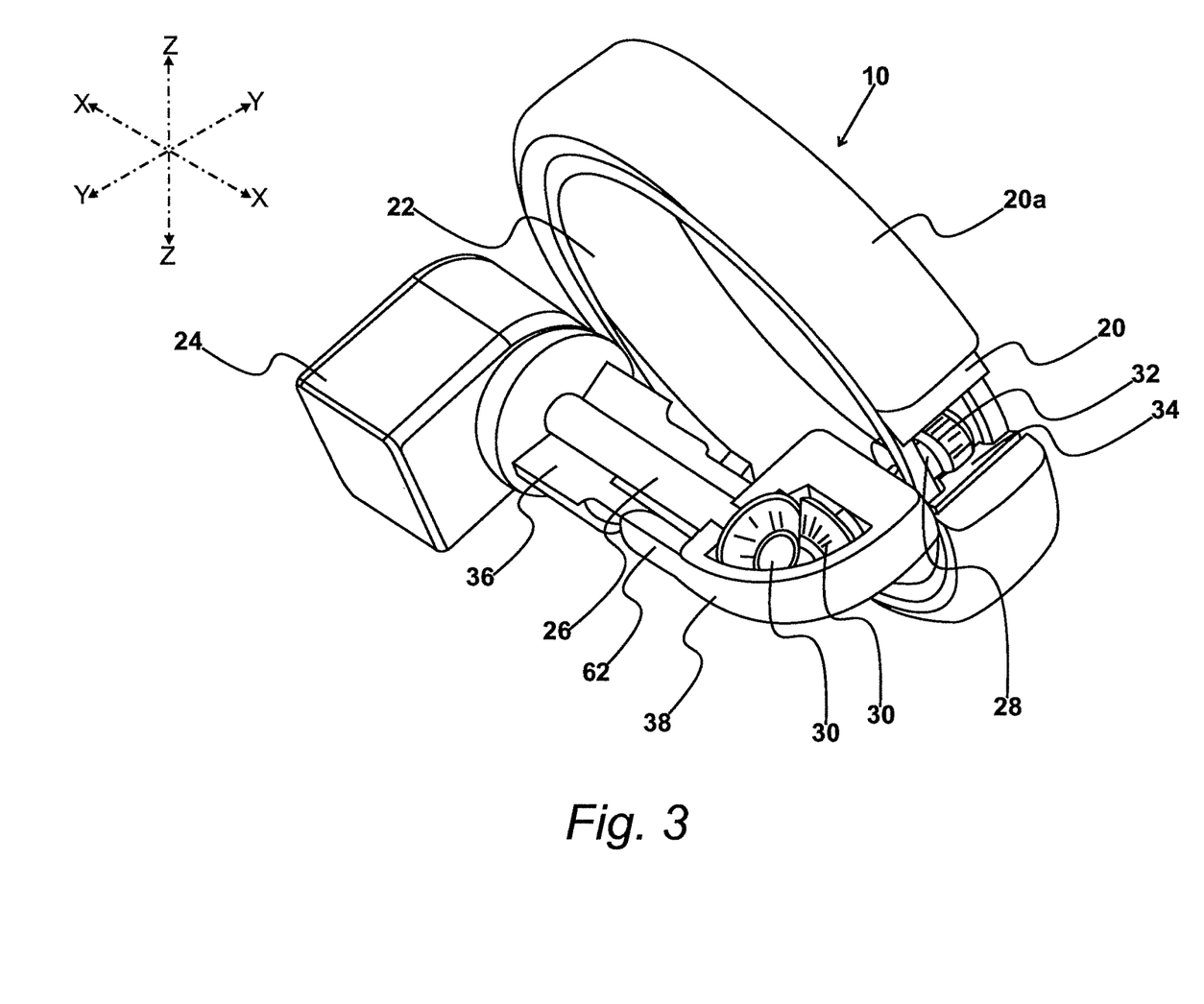
FIG. 3 is an isometric view, partly cut away, of wheel drive means of the invention.

It is convenient now to consider with reference to FIG. 3 the mechanism for driving the centreless wheel 10, as a similar mechanism is used elsewhere in the motor vehicle 100.

The centreless wheel indicated at 10 comprises an annular rotor 20 rotatably carried on a generally annular stator 22. (Although not detailed in FIG. 3, there is a ring bearing between the rotor 20 and the stator 22). The external surface of the rotor 20 has a rubber tyre 20a for engaging the ground when the vehicle 100 incorporating the centreless wheel 10 is in ground mode.

When the vehicle 100 is in ground mode, the rotor 20 is drivable about the stator 22 by means of an electric motor unit 24 incorporating an inverter, operatively connected to wheel drive means comprising a primary drive shaft 26 and a secondary drive shaft 28 interconnected orthogonally at their proximal ends by a pair of bevel gears 30. A pinion 32 secured to the distal end of the secondary drive shaft 28 engages an internal ring gear 34 extending around the radially inner face of the rotor 20. Thus when the motor in the motor unit 24 drives the primary shaft 26, the secondary shaft 28 rotates the rotor 20, and thereby the vehicle 100 fitted with the wheel 10 (and other similar wheels) can be driven over the ground when the vehicle 100 is in ground mode.

When the vehicle 100 is in ground mode, the primary drive shaft 26 is substantially upright, which is to say that it extends generally vertically, on an axis in the X-X direction, and the rotor is rotated about an axis in the azimuthal Y-Y direction. (Mutually orthogonal directions X-X, Y-Y and Z-Z are indicated in FIG. 3).

The primary drive shaft 26 extends through the hollow centre of a first rotary actuator 36. When the first rotary actuator 36 is actuated it turns the wheel 10 about the X-X axis of the primary drive shaft 26, and by this means the motor vehicle 100 can be steered in ground mode.

Figure 4:
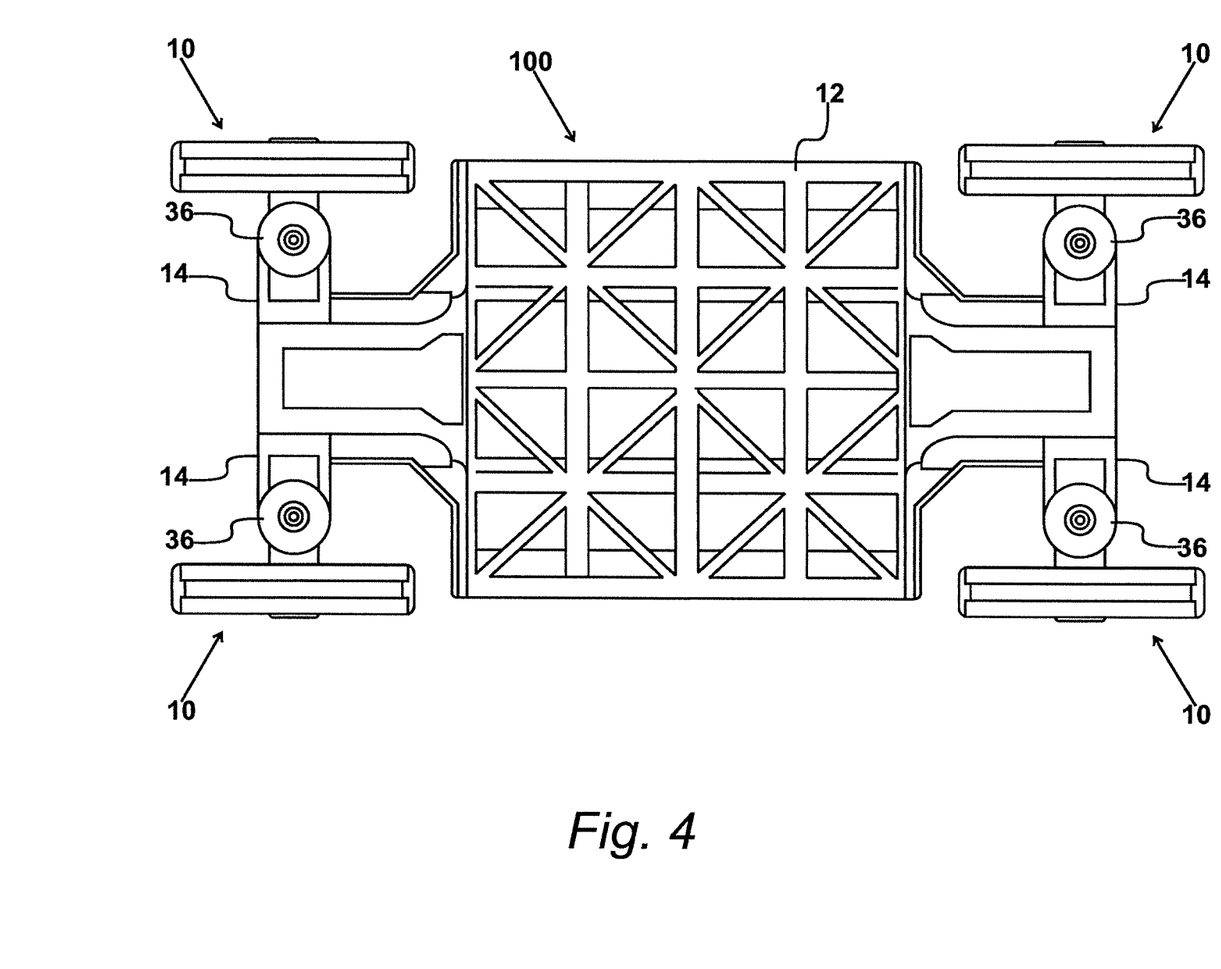
FIG. 4 is a plan view of the vehicle of FIGS. 1 and 2 in ground mode.

This steering operation may be understood more clearly from FIG. 4, which shows in plan view a first rotary actuator 36 for each wheel 10 carried by an associated mounting unit 14. When the first rotary actuators 36 are actuated, they turn the wheels 10 one way or the other to steer the motor vehicle 100. A control unit, not shown in FIG. 4 but which may be wholly or partly aboard the motor vehicle 100 or remote from it, is operatively connected to the first rotary actuators 36 to synchronise the steering movement of the wheels.

The first rotary actuators 36 can be actuated to turn the wheels 10 through 90° about the X-X axis, ie to turn from a forward/backward alignment to being aligned from side to side. This allows the vehicle 100 to be driven sideways fully up to a ground-based feature such as a kerb for parking or a platform for loading.

Each first rotary actuator 36 is a servomotor responsive in its actuation to the orientation of the stator 22 (and therefore of the rotor 20 it carries—see FIG. 3) about the X-X axis, and for convenience it is hereinafter referred to as the steering servo, although it serves a purpose other than steering as will be described later herein.

Returning now to FIG. 3, a second rotary actuator 38 has a hollow centre surrounding the secondary drive shaft 28 and is operatively connected to the stator 22 towards a radially outer part thereof. When the motor vehicle 100 is in ground mode and the second rotary actuator 38 is actuated it turns the stator 22 about the Y-Y axis of the secondary drive shaft 28. By this means, because this Y-Y axis (which is the axis of rotation of the secondary drive shaft 28 and of the turned stator 22) is off-centre relative to the stator 22, the ride height of the motor vehicle 100 is varied as the part of the tyre 20a in contact with the ground is closer to or further from the axis of rotation.

Figure 5:
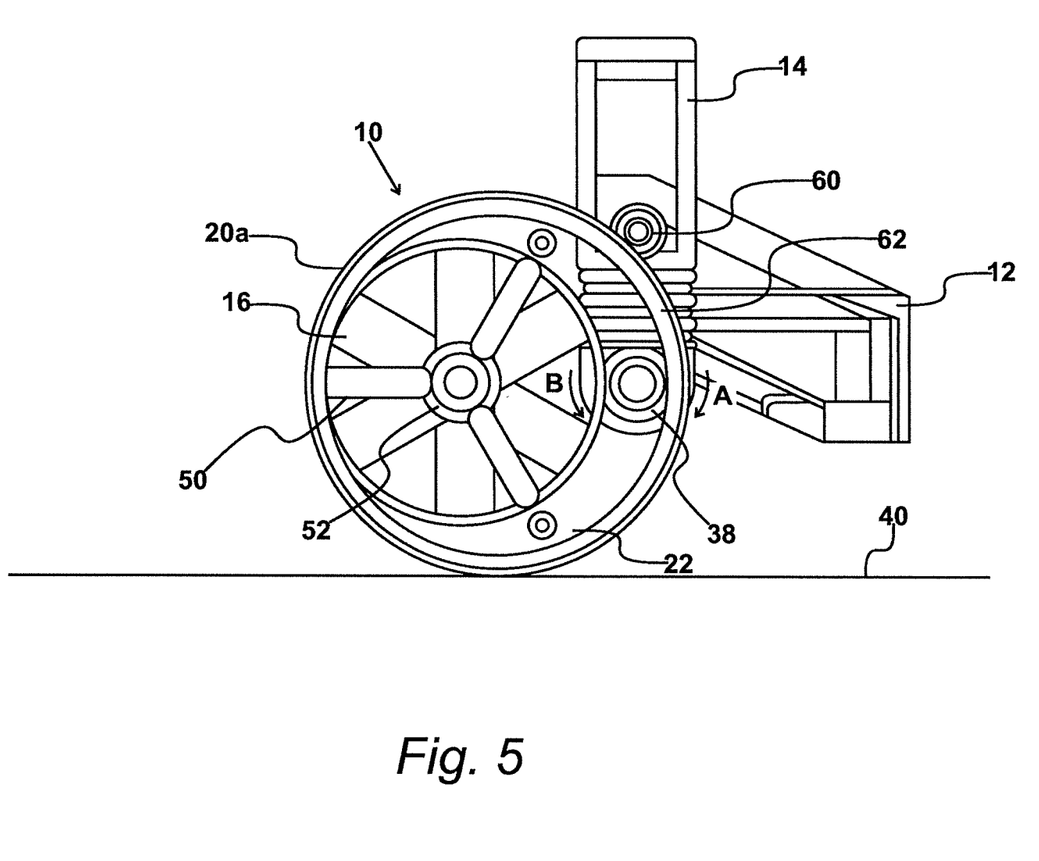
FIG. 5 shows in side elevation a centreless wheel and propeller of the vehicle with drive means therefor, at normal ride height in ground mode.

This ride height adjustment may be understood more clearly from FIG. 5 which shows in side elevation the second rotary actuator 38 carried by the mounting unit 14 and operatively connected to a radially outer (ie off-centre) part of the associated stator 22 of a wheel 10. When the second rotary actuator 38 is actuated to rotate the stator 22 in the direction of the arrow A in FIG. 5 it serves to bring into contact with the ground 40 a part of the tyre 20a which is closer to the axis of rotation of the second rotary actuator 36. Alternatively expressed, when the second rotary actuator 38 is actuated to rotate the stator 22 in the direction of the arrow A, the wheel 10 as a whole is turned in the direction of the arrow A about the axis of rotation of the second rotary actuator 38, and the frame 12 of the motor vehicle 100 is moved closer to the ground 40. If, contrariwise, the second rotary actuator 38 is actuated to rotate the stator 22 in the direction of the arrow B in FIG. 5 it serves to bring into contact with the ground 40 a part of the tyre 20a which is further from the axis of rotation of the second rotary actuator 38, and thus the wheel 10 as a whole is turned in the direction of the arrow B about the axis of rotation of the second rotary actuator 38, and the frame 12 of the motor vehicle 100 is moved further from the ground 40.

Figure 6:
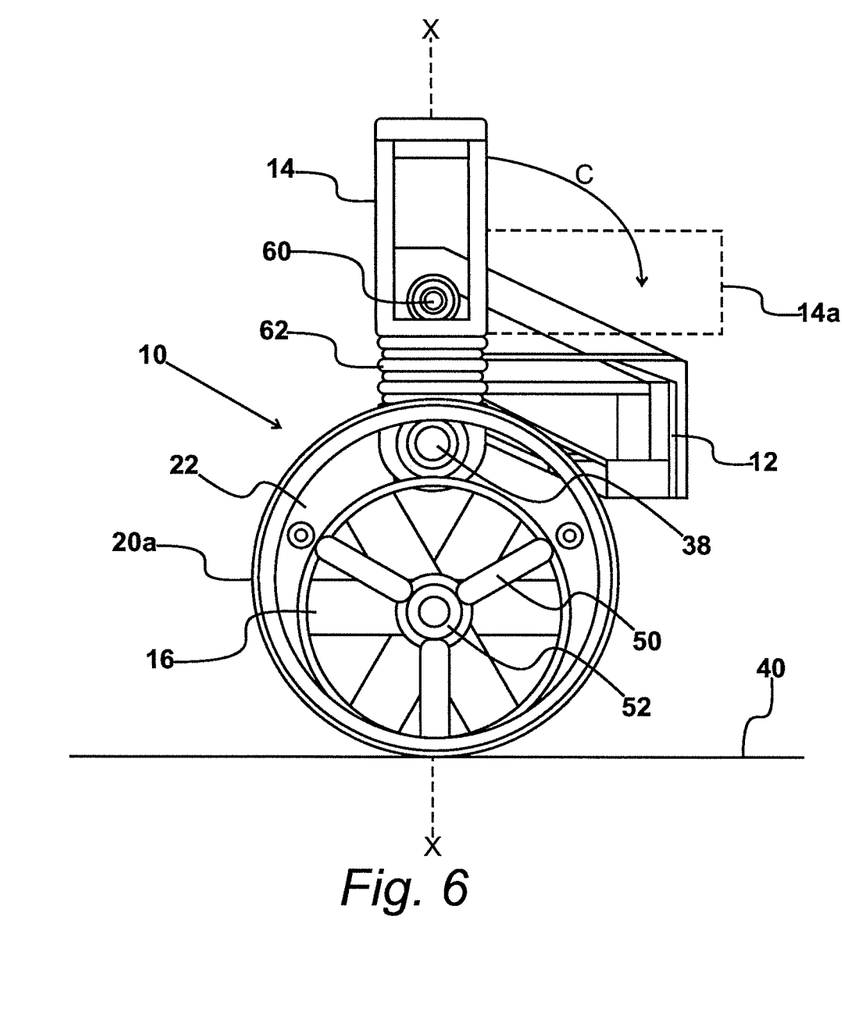
FIG. 6 is a view corresponding to that of FIG. 4 but showing the vehicle at raised ride height.

The maximum ride height is illustrated by FIG. 6.

The second rotary actuator 38 is a servomotor responsive in its actuation to the orientation of the stator 22 (and therefore of the rotor 20 it carries—see FIG. 3) about the X-X axis, and for convenience it is hereinafter referred to as the ride height servo, although it serves a purpose other than varying ride height as will be described later herein).

Most clearly shown in FIGS. 5 and 6, but also visible in others of the drawings, the propeller 16 associated with the centreless wheel 10 is rotatably carried within the open centre of the wheel 10 on a support 50 having three equiangularly-spaced legs extending radially inward from the stator 22 to a hub 52 for the propeller 16. The hub 52 is offset relative to the wheel 10 so that the propeller 16 is clear of the drive means 38 etc for the rotor 20.

When the vehicle 100 is in air mode, the propeller 16 is drivable by means of an electric motor 54 (see FIGS. 1 and 2). It may be noted here that the electric motors 54 for the propellers 16 and the electric motor units 14 for the wheels 10 are powered from electrical batteries (not detailed in the drawings) carried by the frame 12.

Each of the motor units 14 is connected to a third rotary actuator 60 by means of which the motor unit 14 can be turned through 90° about a Y-Y axis as indicated by the arrow C in FIG. 6, so as to be rotatable between its elevated orientation normal in the ground mode of the vehicle 100 to an azimuthal orientation shown ghosted at 14a in FIG. 6.

Figure 7:
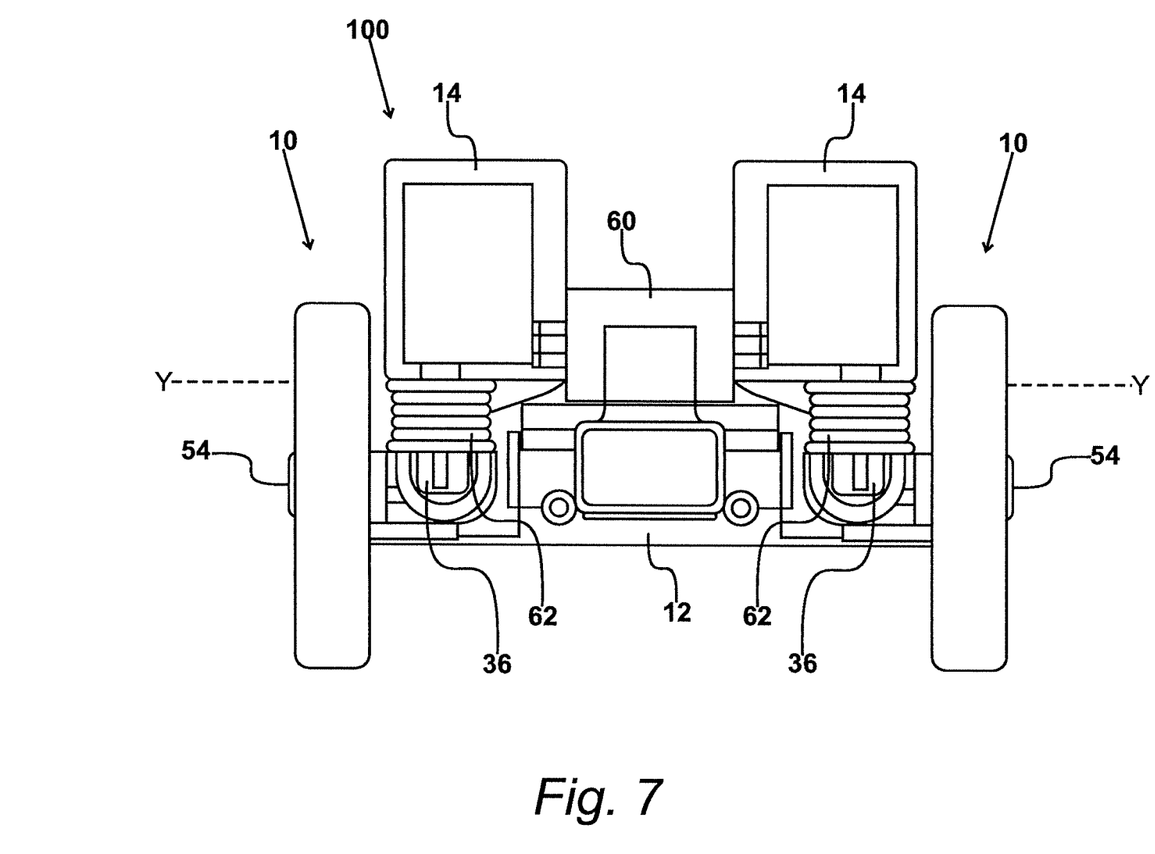
FIG. 7 shows the vehicle in end elevation, at normal ride height.
Figure 8:
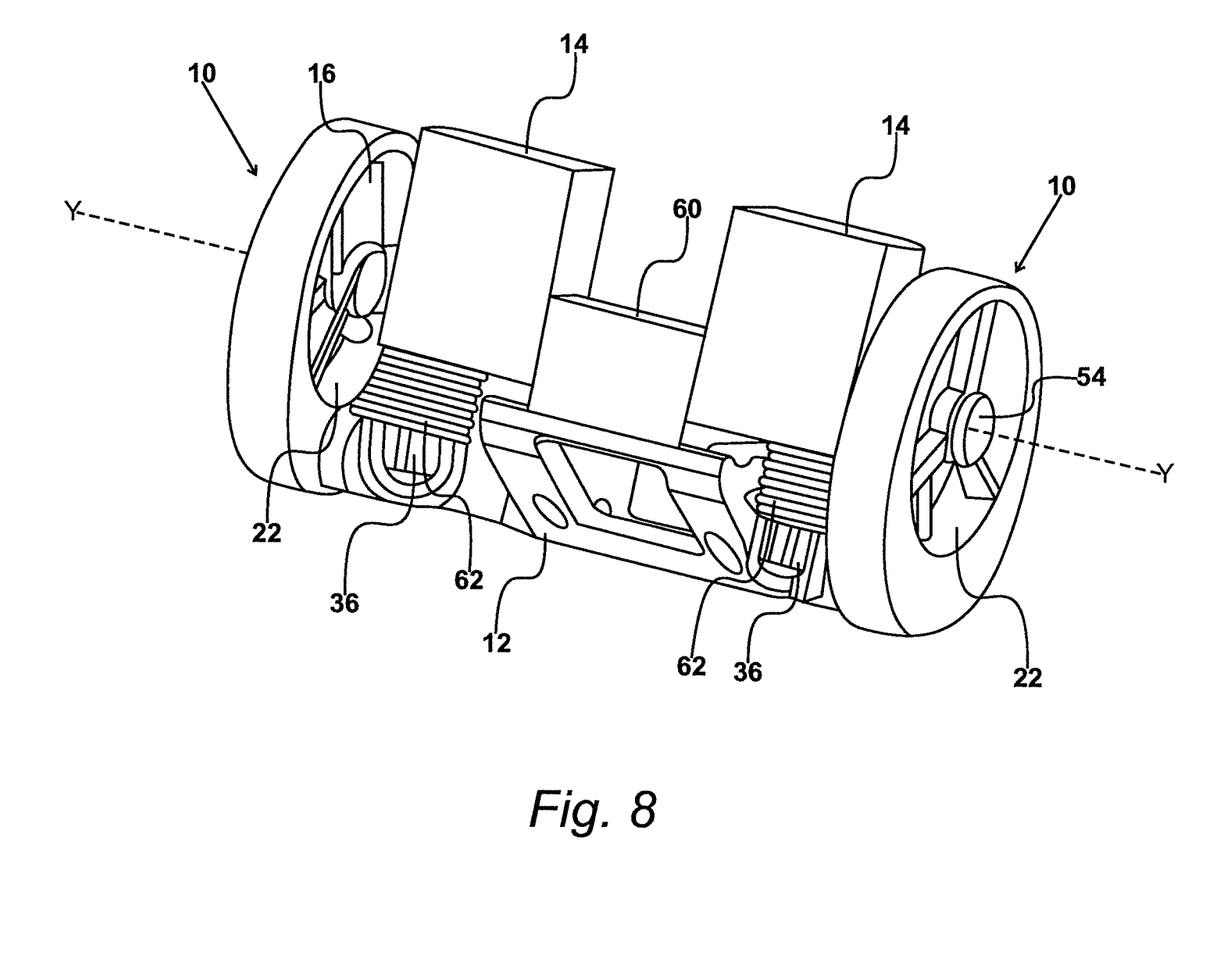
FIG. 8 is an isometric view of an end of the vehicle at lowered ride height.

As can be seen most clearly from FIGS. 7 and 8 a said third rotary actuator 60 serves a pair of motor units 14 mounted side by side on the frame 12. There are two said third rotary actuators 60 each operative when actuated to rotate its associated motor units 14 (and the wheels 10 they carry) about a Y-Y axis. Each said third rotary actuator 60 is a servomotor responsive in its actuation to the orientation about the X-X axis of the stator 22 (and therefore of its associated rotor 20—see FIG. 3) carried by the respective motor unit 14. Said third rotary actuators 60 are hereinafter referred to as motor unit servos, and as will be described later herein they are actuated to changing the configuration of the vehicle 100 from ground mode to air mode.

FIGS. 7 and 8 show suspension units 62 which provide springing for the vehicle 100 when driven over the ground in ground mode. Those skilled in the art of motor vehicles will be readily able to devise appropriate suspension units, eg with coil springs and/or rubber blocks together with dampers and telescopic or other means for varying the vertical extent of the primary drive shafts as the suspension units 62 work.

Other elements of the invention that can be seen in FIGS. 7 and 8 are the centreless wheels 10, the propellers 16 rotatable within the open centres of the wheels 10, the stators 22 carrying the propellers 16, the steering servos 36 and the propeller motors 54.

Figure 9:
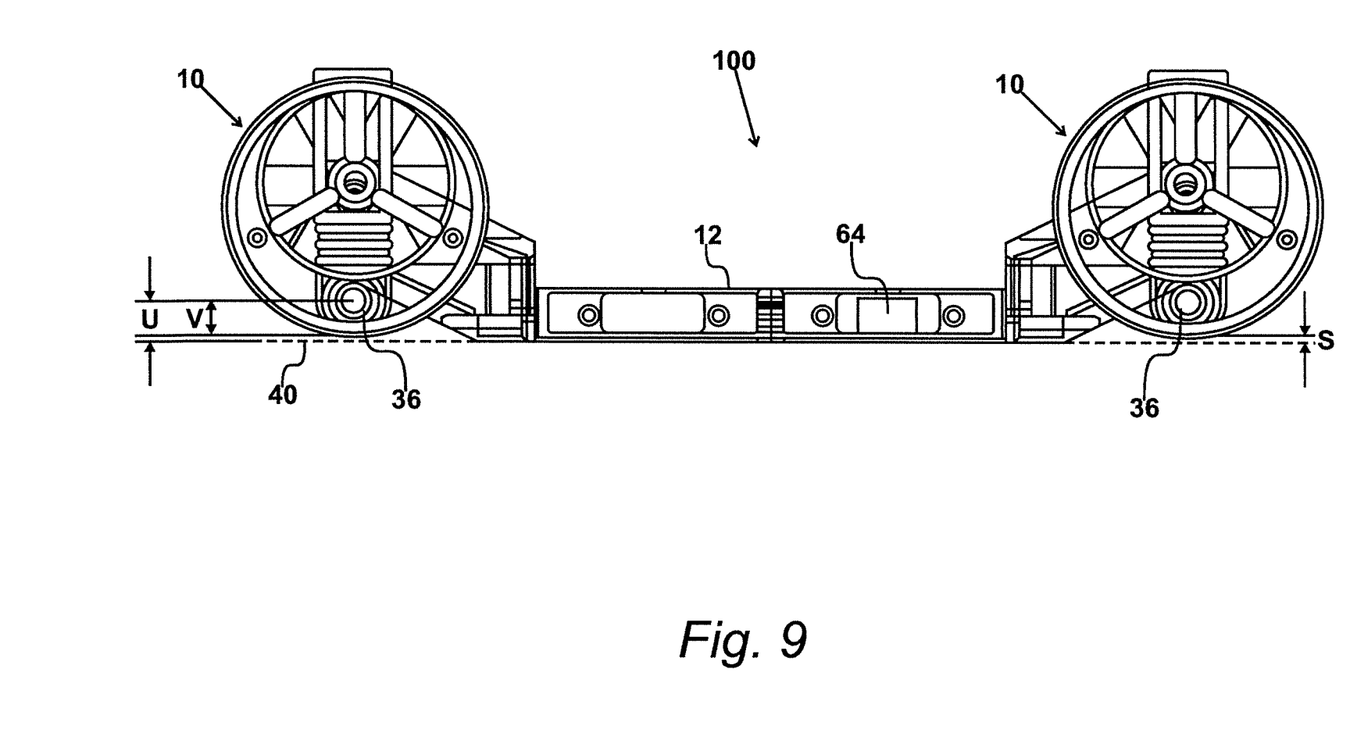
FIG. 9 is a side elevation of the vehicle fully lowered.

The transition of the vehicle 100 from ground mode to air mode will now be described, firstly with reference to FIG. 9.

Before effecting the transition from ground mode to air mode, the wheels 10 are made stationary, this being ensured by a control unit to be explained in more detail hereinafter. Thus for the transition the vehicle 100 is at a standstill. Then the ride height servos 36 are actuated to raise the wheels 10 relative to the frame 12 until the frame 12 rests on the ground 40 and the wheels 10 are clear of the ground 40, as shown in FIG. 9. For convenience, this configuration is herein termed the Base Configuration.

Figure 10:
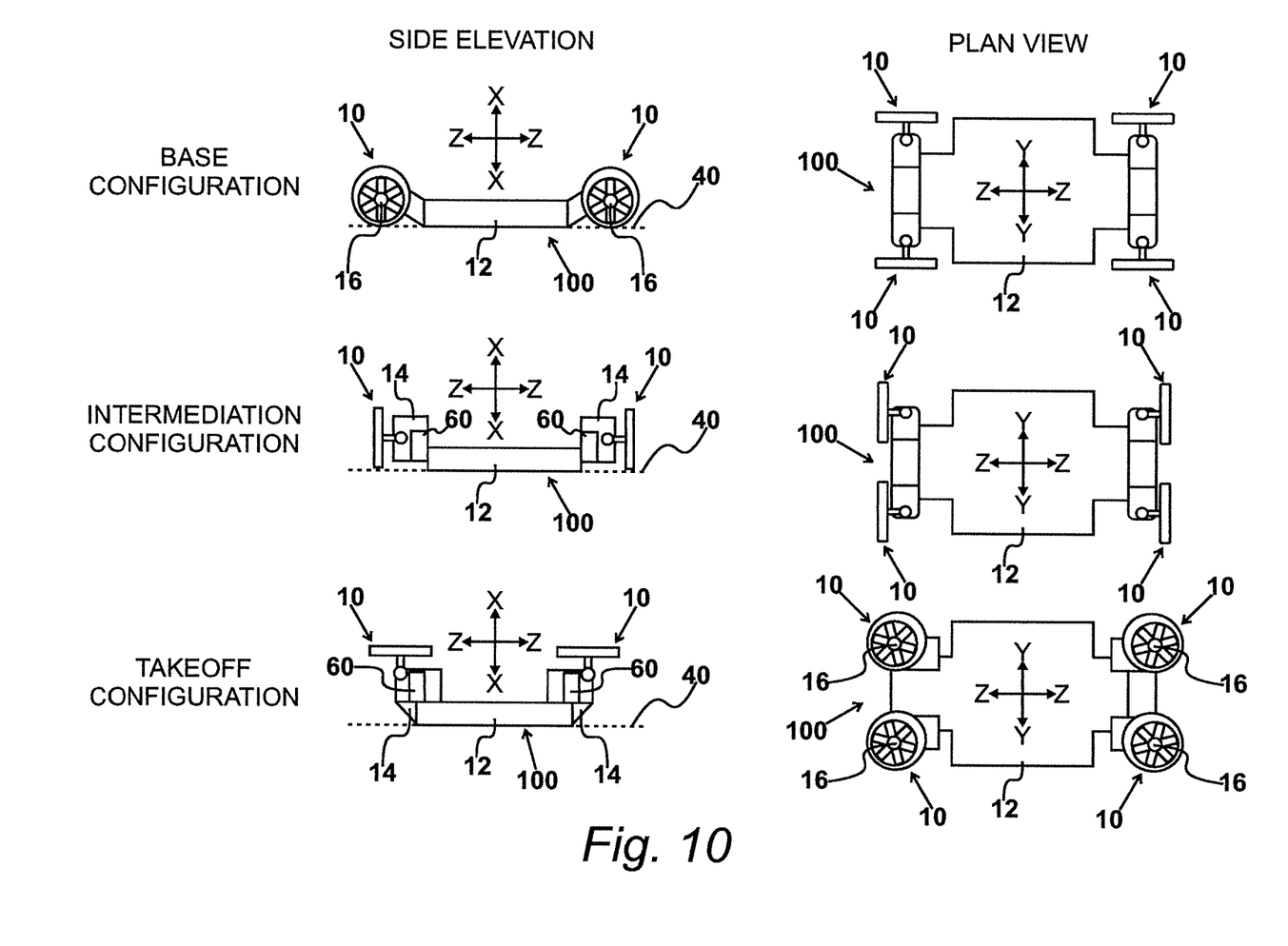
FIG. 10 is a simplified diagrammatic illustration of the transition of the motor vehicle from ground mode to air mode.

The transition of the vehicle from ground mode to air mode is depicted in a simplified diagrammatic form in FIG. 10, showing the vehicle 100 in both side elevation and plan view.

The transition is begun by putting the vehicle 100 into its Base Configuration as described above with reference to FIG. 9, in which the frame 12 of the vehicle 100 rests on the ground 40 and the centreless wheels 10 are just clear of the ground 40, In the Base Configuration the wheels 10 (and the propellers 16 they surround) lie upright and straight ahead—that is they are aligned with the X-X direction and the Z-Z direction (see FIG. 10).

It will be recalled from the foregoing description with reference to FIG. 4 that for steering purposes the steering servos 36 can be actuated to turn the wheels 10 from straight ahead to sideways relative to the vehicle 100. This is now done whilst the wheels 10 are clear of the ground 40, which puts the vehicle 100 into an Intermediate Configuration as shown in FIG. 10. In the Intermediate Configuration the wheels 10 remain upright but are turned through 90°—that is, they are aligned with the X-X direction and the Y-Y direction.

As described hereinbefore with reference to FIGS. 7 and 8, actuation of the motor unit servos 60 rotates the motor units 14 (and thereby the wheel-propeller assembly 10,16 each supports) about a Y-Y axis, and this is now done to convert the vehicle 100 from its Intermediate Configuration to a Takeoff Configuration. Thus the motor unit servos 60 are actuated to turns the motor units 14 about a Y-Y axis and thereby bring the wheels 10 and the propellers 16 they surround into an azimuthal orientation. Then, in the Takeoff Configuration of the vehicle 100, the propellers 16 can be driven by the propeller motors 54 (see the foregoing description with reference to FIGS. 7 and 8) to lift the vehicle 100 from the ground 40.

After takeoff, ie when the vehicle 100 is in its air mode, the wheel-propeller assemblies 10,16 can be tilted selectively and controlledly by means of the steering servos 36 and the motor unit servos 60 to direct the thrust of the propellers 16 forwards or backwards and sideways relative to the vehicle 100, whereby the vehicle 100 can be directed when in the air.

To convert the vehicle 100 from air mode (when in flight) to ground mode, the wheel-propeller assemblies 10,16 are set substantially horizontal and the propellers are progressively slowed until the vehicle 100 lands on the ground 40. The propellers 16 are then stopped, the motor unit servos 60 are actuated to turn the wheel-propeller assemblies 10,16 through 90° from horizontal to vertical, and the steering servos are then actuated to reorientate the wheel-propeller assemblies 10,16 from sideways to straight ahead. All this time the wheels 10 have been clear of the ground. The ride height servos 36 can now be actuated to bring the wheels 10 into contact with the ground and lift the frame 12 to a required ride height. The vehicle 100 is then ready for use on the ground.

Returning now to FIG. 9, this shows schematically represented a control unit 64 housed within the frame 12 of the vehicle 100. The control unit 64 is operatively connected to the drive motors 24 and 54 and the servos 36, 38 and 60 to manage and synchronise their various operations. The control unit 64 may comprise a transponder responsive to a remote manually-operated radio controller (not shown in the drawings) within or beyond visible line of sight or it may be an autonomous pre-programmed controller. For completeness it should be understood that any use of the vehicle 100 other than within visible line of sight will be subject to regulations demanding "detect and avoid" (DAA) capability, a segregated airspace and attention to avoidance of any threat to aviation or to persons or objects on the ground.

Figure 11:
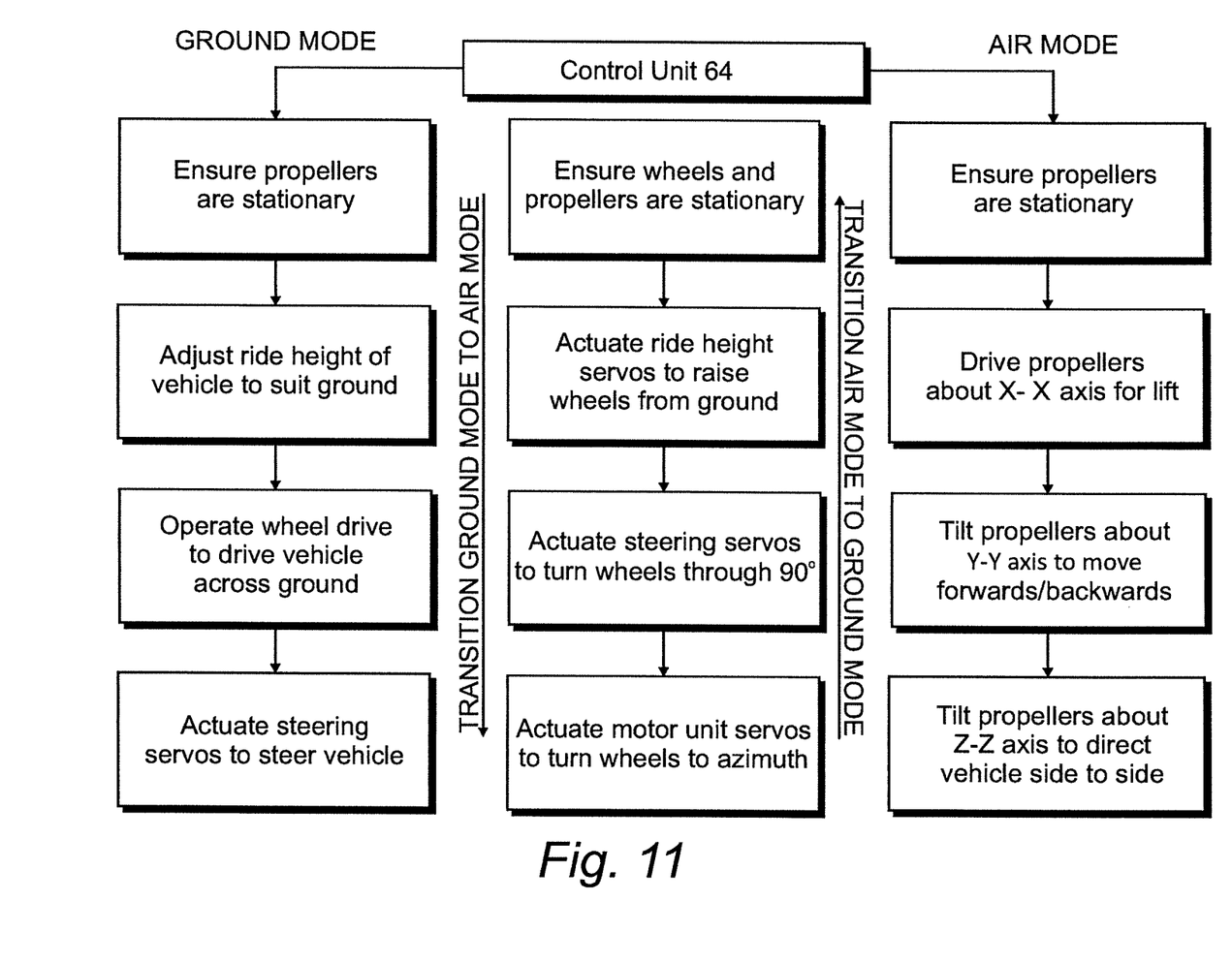
FIG. 11 summarises the operation of a control unit of the invention in ground mode and air mode and in transition from one mode to the other.

The control unit 64 manages and synchronises the various operations of the drive motors 24 and 54 and the servos 36, 38 and 60 as summarised in FIG. 11.

In ground mode, the control unit 64 firstly ensures that the propellers 16 are stationary. The ride height of the vehicle 100 is then adjusted by means of the ride height servo 38 to a level appropriate for the ground. The wheel drive motors 24 are then operated to drive the vehicle 100 over the ground, steered by means of the steering servos 36.

In air mode the propellers 16, which are initially stationary, are driven about an X-X axis by the propeller motors 54, which lifts the vehicle 100 from the ground. Then, to guide the vehicle 100 when in the air, the propellers 16 can be selectively and controlledly tilted about a Y-Y axis (by the motor unit servos 60) and about a Z-Z axis (by the steering servos).

To convert the vehicle 100 from ground mode to air mode, the control unit 64 firstly ensures that the wheels 10 and the propellers 16 within their open centres are all stationary. Then the ride height servos 38 are actuated to effect relative vertical (X-X) movement between the wheels 10 and the frame 12 of the vehicle 100 until the bottom of the frame 12 rests on the ground 40 and the wheels 10 are clear thereof (as shown in FIG. 8). The steering servos 36 are then actuated to turn the wheels 10 through 90° about an X-X axis, from straight ahead (in a Z-Z direction) to a sideways alignment (in a Y-Y direction). The final step in converting the vehicle 100 from ground mode to air mode is to actuate the motor unit servos 60 to turn them through 90° about a Y-Y axis to bring the wheel-propeller assemblies 10,16 into an azimuthal orientation, ready for takeoff.

As indicated in FIG. 11, the procedure described above for converting the vehicle 100 from ground mode to air mode is reversed to convert it from air mode to ground mode.

What is claimed is:

1. A motor vehicle having a ground mode for use of the vehicle on the ground and an air mode for use of the vehicle in the air, which motor vehicle comprises:
    a frame; a plurality of centerless wheels, each comprising an annular rotor carried on a stator and being drivable thereabout, which rotor has an open center and is engageable with the ground when the vehicle is in the ground mode;
    a plurality of mounting units on the frame, each including a motor unit operatively connected by way of a drive shaft arrangement to the rotor of the respective wheel and operable to rotate that rotor relative to the stator that carries it when the motor vehicle is in the ground mode;
    a plurality of propellers, each associated with a respective centerless wheel and being rotatable within the open center thereof when the vehicle is in the air mode; and
    a propeller drive operatively connected to each propeller and operable to drive it when the vehicle is in the air mode;
    wherein:
    an axis of rotation of each centerless wheel is parallel with an axis of rotation of the propeller with which the centerless wheel is associated;
    each centerless wheel is configured to be rotated through 90 degrees to convert the motor vehicle from the air mode to the ground mode.

2. The motor vehicle as claimed in claim 1, wherein each propeller is driven about an axis parallel to but offset from an axis about which the associated wheel is driven.

3. The motor vehicle as claimed in claim 1, wherein said wheel drive is powered from one of an electrical battery or a fuel cell.

4. The motor vehicle as claimed in claim 1, wherein said propeller drive comprises a motor mounted within the open center of a respective centerless wheel, which motor is powered from an electrical battery.

5. The motor vehicle as claimed in claim 1, wherein each rotor includes an internal ring gear extending around a radially inner face of the rotor, and each drive shaft arrangement includes a pinion configured to engage the internal ring gear of the rotor of the respective wheel.

6. The motor vehicle as claimed in claim 1, wherein each mounting unit further comprises a rotary actuator operatively connected to the stator of the respective wheel at an off-center position relative to the stator, and configured to rotate the stator to adjust a ride height of the vehicle when used on the ground.

7. The motor vehicle as claimed in claim 6, wherein the drive shaft arrangement includes at least one drive shaft operatively connected to the rotor of the respective wheel, and the rotary actuator has a hollow center which is configured to surround said at least one drive shaft.

8. The motor vehicle as claimed in claim 1, wherein each stator is configured and arranged to be rotatable about three stator axes respectively extending (a) in an X-X direction extending up and down relative to the vehicle, (b) in a Y-Y direction extending from side to side relative to the vehicle and (c) in a Z-Z direction extending forward and backward relative to the vehicle.

9. The motor vehicle as claimed in claim 8, wherein said three stator axes are mutually orthogonal.

10. The motor vehicle as claimed in claim 8, wherein each mounting unit comprises a first rotary actuator configured and arranged to turn the associated stator about the X-X axis, a second rotary actuator configured and arranged to turn the associated stator about the Y-Y axis and a third rotary actuator configured and arranged to turn the mounting unit about the Y-Y axis.

11. The motor vehicle as claimed in claim 10, wherein said first rotary actuator is of hollow form and has a primary drive shaft of the wheel drive extending through it.

12. The motor vehicle as claimed in claim 10, wherein said second rotary actuator is of hollow form and has a secondary drive shaft of the wheel drive extending through it.

13. The motor vehicle as claimed in claim 10, wherein said third rotary actuator is operable to rotate the respective mounting unit on the frame of the vehicle.

14. The motor vehicle as claimed in claim 10, wherein each said rotary actuator comprises a servomotor responsive to the orientation of the associated stator relative to the frame of the vehicle.

15. The motor vehicle as claimed in claim 10, wherein said vehicle includes a control system operable remotely by wireless control signals to operate said rotary actuators selectively.

16. The motor vehicle as claimed in claim 15, wherein said control system is operable beyond a visible line of sight.

17. The motor vehicle as claimed in claim 15, wherein said control system is operative to synchronize operation of said rotary actuators.

18. The motor vehicle as claimed in claim 17, wherein said control system is operative automatically to cease rotation of said propellers when said vehicle is in the ground mode and to cease rotation of said centerless wheels when said vehicle leaves the ground mode.

19. A motor vehicle having a ground mode for use of the vehicle on the ground and an air mode for use of the vehicle in the air, which motor vehicle comprises:
    a frame;
    a plurality of centerless wheels, each having an associated mounting unit, whereby each wheel is mounted on the frame, each said wheel comprising an annular rotor carried on a stator and being drivable thereabout, which rotor has an open center and is engageable with the ground when the vehicle is in the ground mode;
    a wheel drive on or in each mounting unit, operatively connected to the rotor of the respective wheel and operable to rotate that rotor, and a rotary actuator operatively connected to the stator of the respective wheel at an off-center position relative to the stator, and configured to rotate the stator to adjust a ride height of the vehicle when used on the ground;

a plurality of propellers each associated with a respective centerless wheel and being rotatable within the open center thereof when the vehicle is in the air mode; and a propeller drive operatively connected to each propeller and operable to drive it when the vehicle is in the air mode.

\* \* \* \* \*